May 2, 1967      H. F. MEYER      3,316,629

MACHINE TOOL TOOL CHANGER

Filed Sept. 18, 1963      5 Sheets-Sheet 1

INVENTOR
HENRY F. MEYER

BY Cameron, Kerkam + Sutton
ATTORNEYS

May 2, 1967 — H. F. MEYER — 3,316,629
MACHINE TOOL TOOL CHANGER
Filed Sept. 18, 1963 — 5 Sheets-Sheet 2

INVENTOR
HENRY F. MEYER
BY
Cameron, Kerkam & Sutton
ATTORNEYS

May 2, 1967
H. F. MEYER
3,316,629
MACHINE TOOL TOOL CHANGER
Filed Sept. 18, 1963
5 Sheets-Sheet 4
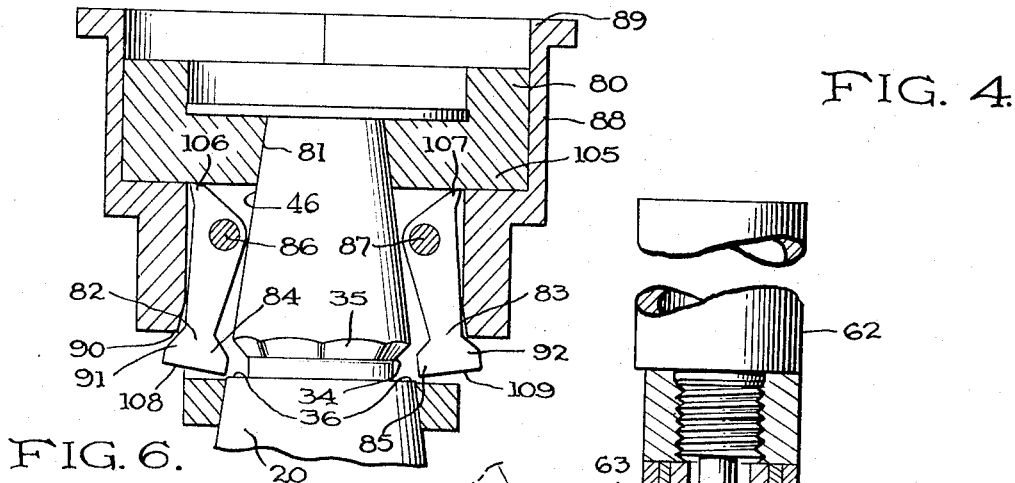
FIG. 4.
FIG. 6.
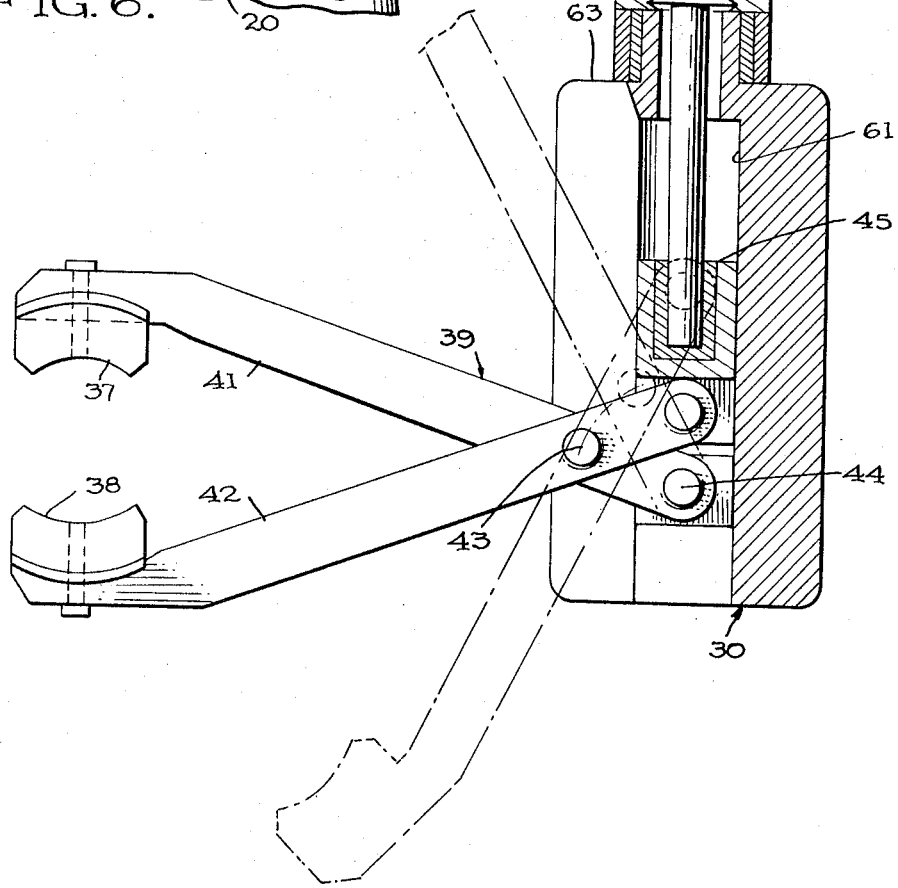
INVENTOR
HENRY F. MEYER
BY Cameron, Kerkam & Sutton
ATTORNEYS

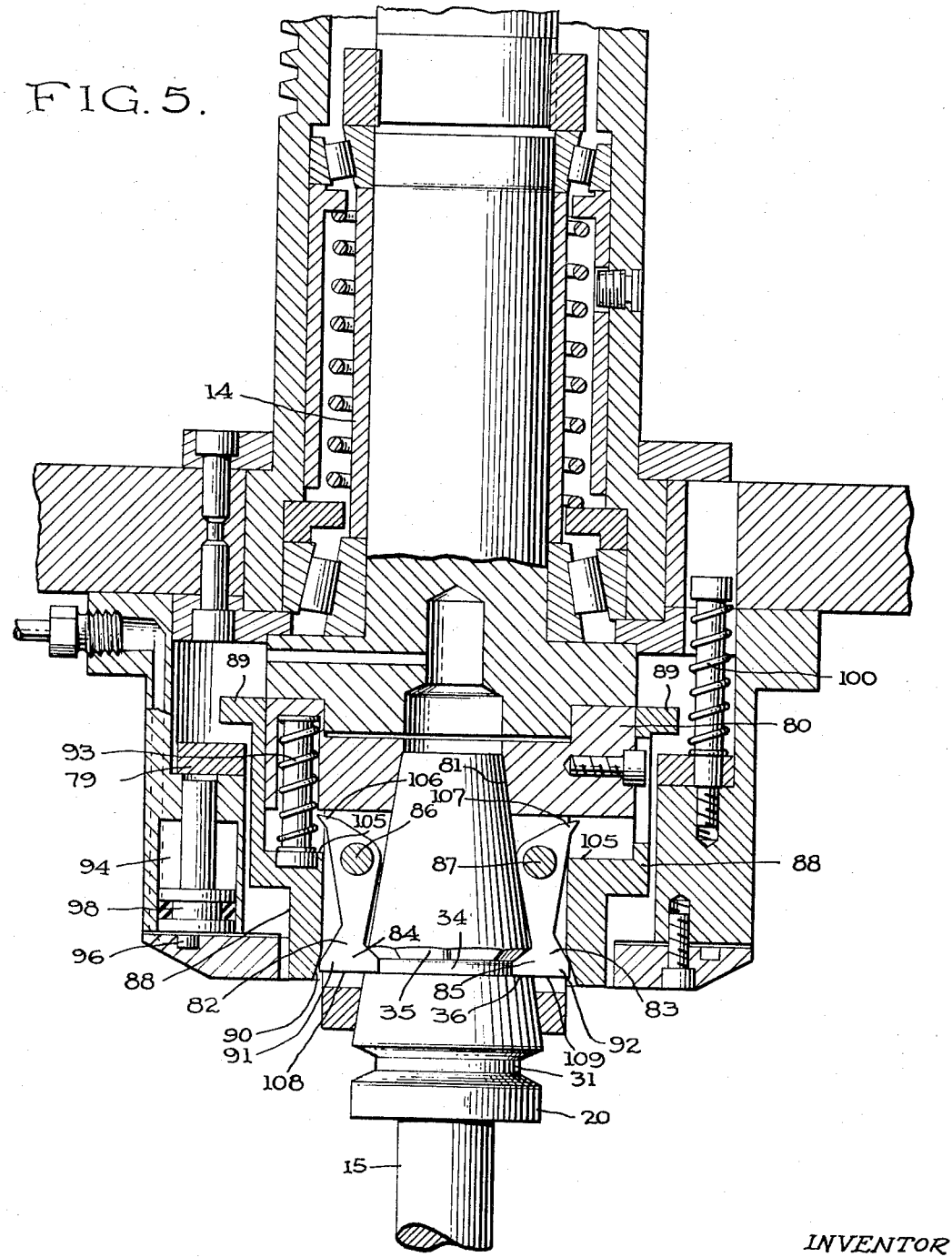

United States Patent Office 3,316,629
Patented May 2, 1967

3,316,629
MACHINE TOOL TOOL CHANGER
Henry F. Meyer, Cortland, N.Y., assignor to The Monarch Machine Tool Company, a corporation of Ohio
Filed Sept. 18, 1963, Ser. No. 309,700
12 Claims. (Cl. 29—568)

The present invention relates generally to machine tools and more particularly to an improved tool change mechanism for changing a tool at the operating station of a machine.

In a machining operation where a large number of holes must be accurately bored, a jig boring maching is utilized to drill or bore these holes with a high degree of accuracy both as to location and to hole diameter. The use of these boring machines requires time consuming and laborious preparation by highly skilled operators which therefore requires both a large outlay in labor and time of skilled mechanics. Present day computers and programming techniques have helped solve many of the problems in precision machining operations; however, in automatic machining operations, where a minimum amount of supervision is employed, breakdown due to jamming of parts, which may result due to error on the part of the machine operator in set up of the machine can have a costly and disastrous effect.

In the present invention there is provided a tool change mechanism readily adapted for automatic or programmed operation and which avoids the problem of manual insertion of tools while permitting rapid removal and insertion of tools at the operating station of a machine tool, such as a boring, tapping, milling or drilling machine.

Accordingly, it is a general object of the present invention to provide a machine tool equipped with an improved tool change mechanism.

Another object of the present invention is to provide a machine tool equipped with an improved tool change mechanism which is simple and economical in construction.

A further object of the present invention is to provide a machine tool with a rotary spindle and having improved automatically operated mechanical means that are operative to replace the cutting tool in the spindle.

Another object of the present invention is to provide an improved tool adapter for carrying a tool and adapted to be readily inserted and withdrawn in a rotary spindle of a machine tool without jamming.

Yet another object of the present invention is to provide an improved machine tool equipped with a plurality of cutting tools that may be readily inserted or withdrawn in a rotary spindle for performing a variety of machining operations.

Still another object of the present invention is to provide an improved machine tool equipped with a plurality of cutting tools which are stored in a minimum space and readily adapted for automatic insertion or withdrawal to or from an operating station.

In carrying out the present invention, in one embodiment thereof, the machine tool is equipped with a rotary spindle and a plurality of cutting tools adapted to be individually received by the spindle for rotation therewith to perform a machining operation. The cutting tools are mounted in tool adapters which are in turn stored in a turntable so that they may be moved in a circular path to locate the desired tool at a tool change station. At the tool change station, a mechanical tool changer may be operated to remove the desired cutting tool and adapter from the turntable and insert it into the spindle for performing the machining operation. During the machining operation, the tool changer is maintained clear of the cutting tool and spindle at the operating station. When demand is made for a new tool, the tool changer removes the tool from the spindle and replaces the cutting tool on the turntable. The turntable is indexed to bring the next tool, selected by demand, to the tool changing station where the tool change process is repeated.

In accordance with another feature of the present invention, each tool is mounted in a tool adapter. The tool adapter is tapered and is notched or grooved along the tapered surface to provide opposed oblique plane surfaces. The spindle is provided with a chuck receptacle having a matching taper to receive the tool adapter. The chuck receptacle is provided with a plurality of latches having opposed fitting surfaces which engage the opposed oblique surfaces of the tool adapter when it is inserted in the chuck receptacle to lock and drive the tool and its adapter in place.

Yet another feature of the present invention is the tool changer for transporting the tool and its adapter back and forth from the turntable to machine tool spindle. The tool changer is powered by a fluid motor and comprises tongs having gripping ends which fit into one of the grooves of the tool adapter for transporting the tool to the operating station. The tongs are swung arcuately in a vertical plane and means are provided to open and close the tongs in various planes perpendicular to the vertical plane.

While the specification concludes with claims particularly pointing out and distinctly claiming the subject matter regarding the present invention, it is believed that the invention will be better comprehended from the following description taken in connection with the accompanying drawings.

FIG. 4 is a partial plan and partial cross-sectional view of the tool transferring device; and FIGS. 5 and 6 are partial side elevational views and partial cross-sectional views of the spindle and chuck receptacle taken along line 5—5 of FIG. 3.

Reference is now made more particularly to the drawings which illustrate, with particularity, the features of the present invention. For convenience, and to avoid confusion, like parts of the various drawings have been identified with like numerals.

Figure 1:
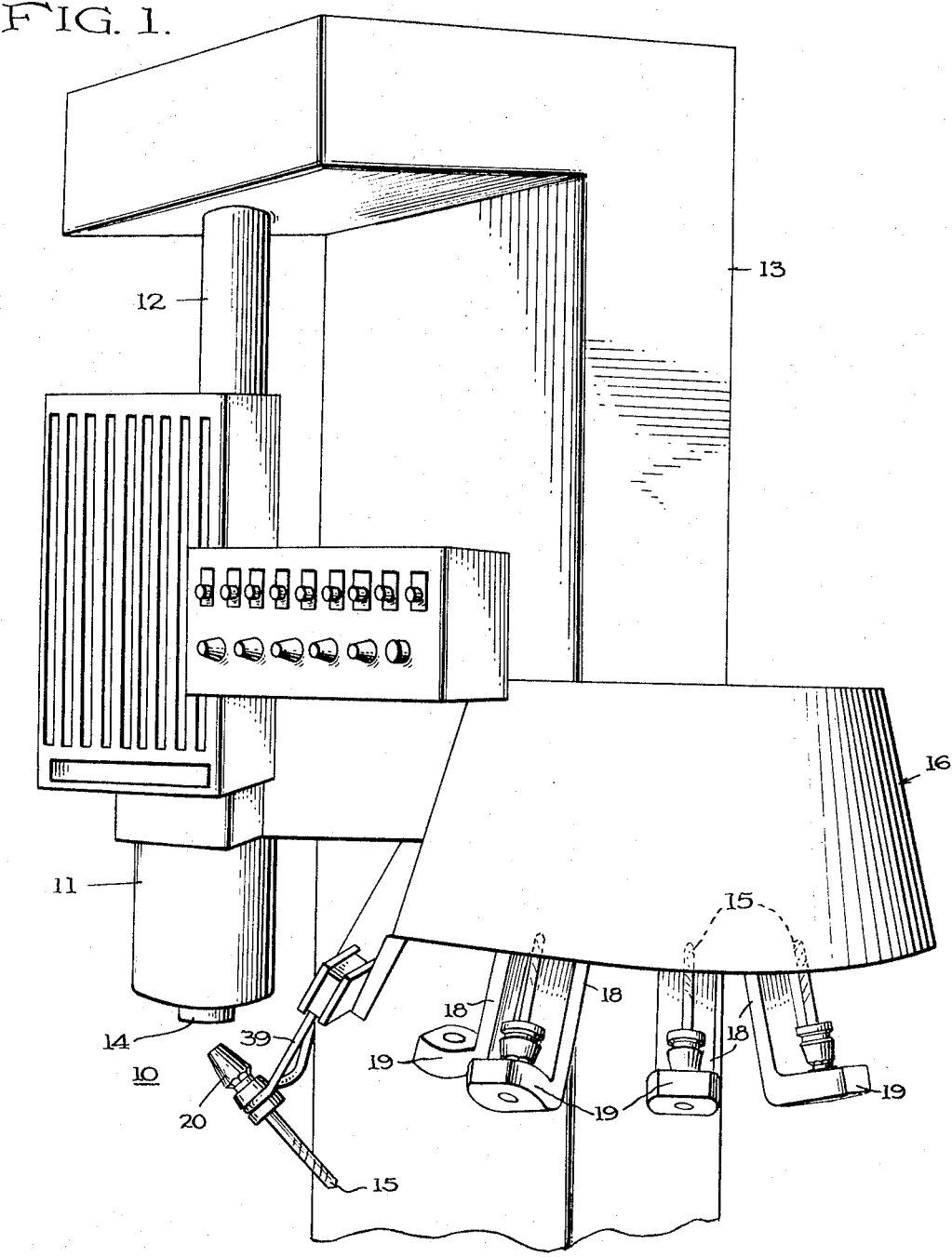
FIG. 1 is a perspective view of the assembled device illustrating the turntable, tool changer and part of the machine tool.

Referring now to FIG. 1, there is illustrated, in part, a machine tool incorporating the features of the present invention which are readily adaptable for use with a variety of commercial boring or drilling machines such as, for example, the Edlund Model #2N Edlund-Matic drilling and tapping machine. Such a machine comprises, generally, an operating station 10 at which is located a spindle head or tool head 11 carried on a vertical column 12 supported by the machine frame or body 13 and arranged for movably supporting the spindle head 11 in a vertical path of travel. The spindle head 11 rotatably supports a spindle 14 that is adapted to carry a tool 15 to rotate with the spindle 14 for performing a machining operation. The spindle 14 is rotated in a well known manner by a motor (not shown) and by vertical movement in a downward direction causing the tool 15, when it comes in contact with the workpiece, to perform its machining operation.

Figure 2:
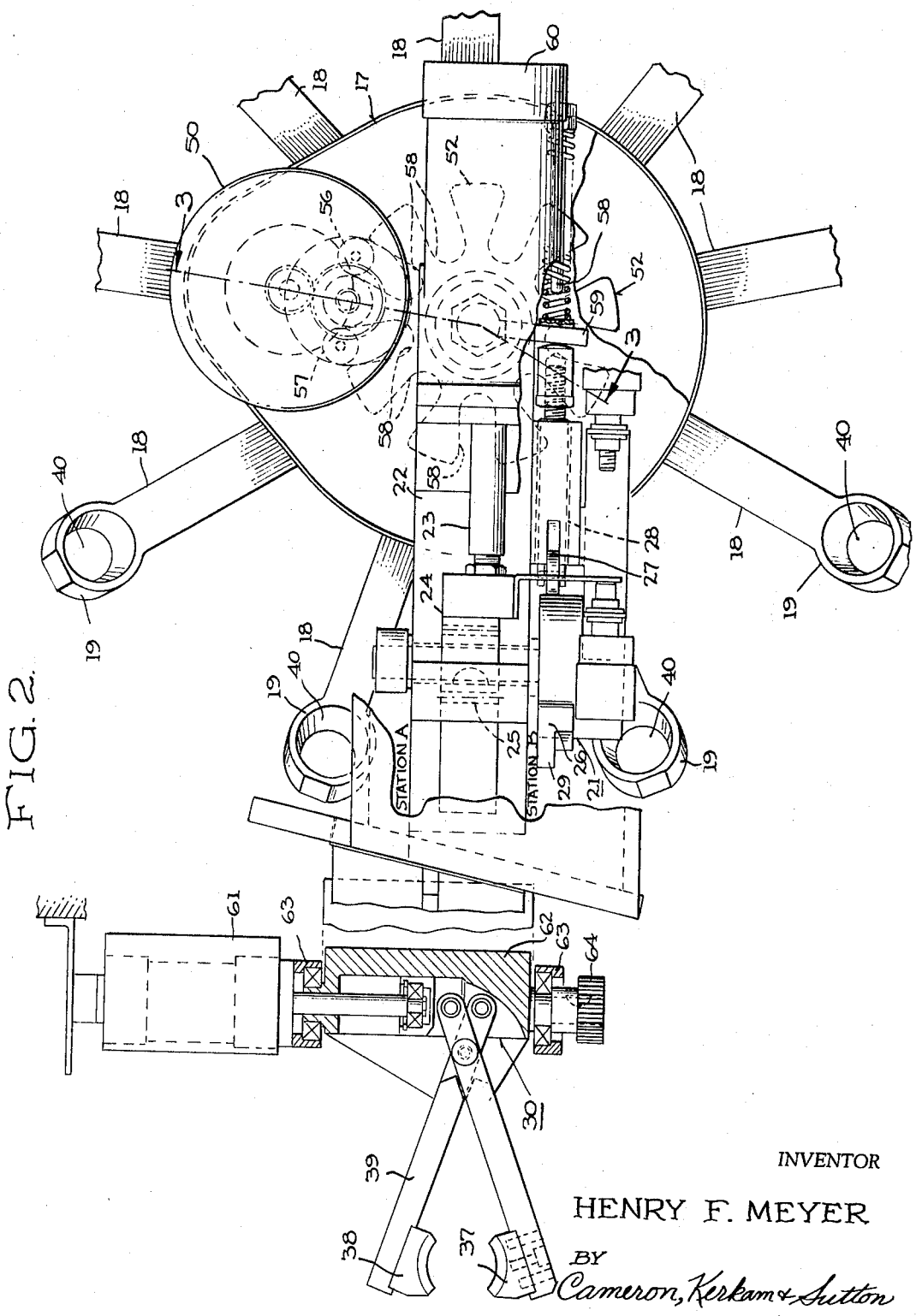
FIG. 2 is a partial top plan view of the turntable and tool changer.
Figure 3:
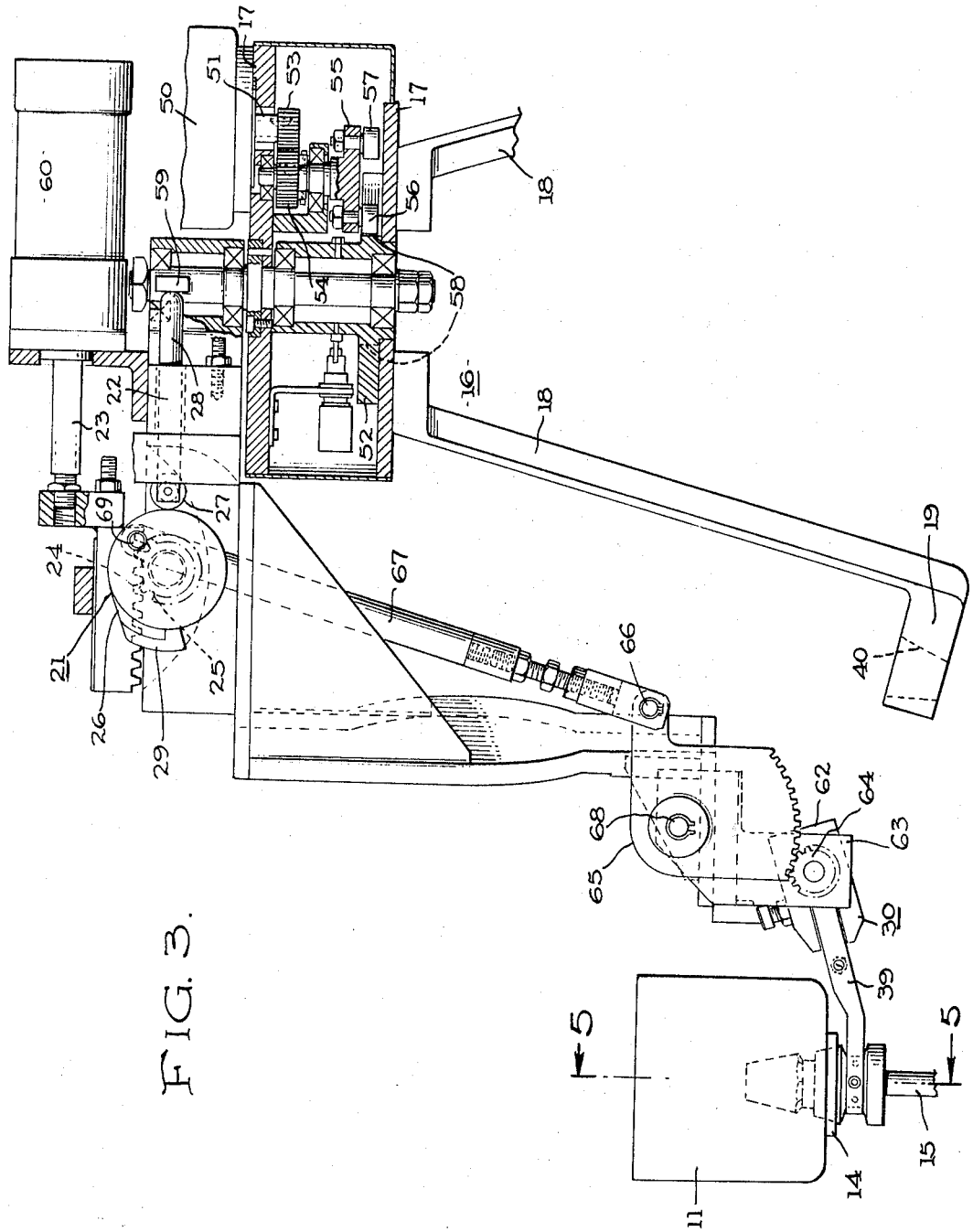
FIG. 3 is a side elevational view of the parts shown in FIG. 2.

In accordance with the present invention, the machine tool, illustrated in part in FIG. 1, is equipped with tool storage means 16 more clearly shown in FIGS. 2–3, which may comprise a horizontally disposed turntable 17 having a plurality of tools 15 arranged in a matrix to thereby provide a number of tool storage positions. While the specific embodiment shown illustrates nine storage positions or stations, it should be readily apparent that any number of storage positions may be provided as long as sufficient clearance is maintained between storage positions to permit withdrawal and replacement of the tools 15 in a manner to be hereinafter described.

The tool storage means 16 serves to carry the variety of tools 15 in storage and to transfer or move selected tools individually to a tool change position or tool ready station where they may be made accessible to a tool change mechanism. For this purpose, turntable 17 has attached thereto, in any suitable manner, a plurality of obliquely extending legs 18 at the extremities of which are secured sockets or receptacles 19 in which the tools are deposited.

The various tools 15 are securely mounted in tool adapters 20, the outer surface of which is tapered at 46. For providing a gripping surface for the tool change mechanism 30, the tool adapter 20 is notched or grooved along the tapered surface at 31, to facilitate gripping by the gripping surfaces or arms 37, 38 of tongs 39 of the tool change mechanism 30. A second groove 34 having a plurality of generally opposed oblique plane surfaces 35 is provided to facilitate operative locking and driving of the tool adapter and tool at the machine operating station.

Both grooves 31 and 34 are circumferential and extend around the periphery of the tapered surface 31, preferably being closer to one end of the tool adapter.

The opposed oblique plane surfaces 35, when the tool adapters 20 are locked in the spindle 14, serve to prevent rotation of the tool adapters 20 when the spindle 14 is rotatably driven and thus permit the tool 15 to be operatively driven and perform its work function. As more clearly shown in FIGS. 5 and 6, there may be provided matching pairs of oblique plane surfaces 35 which may be, for example, eight in number providing four pairs.

To permit the tool adapters 20, in which the tools 15 are mounted, to be easily interchangeable, each receptacle 19 has its inner surface 40 formed with a standard steep machine tool taper corresponding to that of the tool adapters 20. The tool adapters 20 are stored in the receptacles 19 and are maintained in place by the fitting tapers 46 and 40 which prevent the tools 15 and their corresponding adapters 20 from falling out of the receptacles 19 due to vibration or jarring.

The turntable is journalled on a mounting plate 47, in turn journalled on a fixed mounting plate 22. For indexing the turntable 17, there is mounted on the fixed mounting plate 22 of the tool storage means 16 a motor 50 which is of the slow synchronous stepping type having instant starting, stopping and reversing characteristics connected to a suitable power source (not shown) such as a 110-volt A.C. line. The motor 50 is vertically oriented on turntable 17 and is operatively connected by a shaft 51 to an indexing plate 52. Shaft 51 is provided with a suitable driving gear 53 which meshes with a follower gear 54. Follower gear 54 is operatively connected to disc member or flange 55 which supports a pair of indexing rollers 56 and 57 which extend into cooperative engagement with slots 58 of the indexing plate or Geneva gear 52. Slots 58 are suitably spaced on the indexing plate 52 in accordance with the number of tool holding positions provided. In operation, motor 50 drives the flange 55 and the indexing rollers 56 and 57 so that for every 180° turn of the flange 55, the indexing plate 52 is positioned to move to its next station or one tool position.

The indexing of the turntable may be accomplished through a suitable programming system utilizing a memory device such as a perforated tape used in numerical positioning systems. The precise control of the indexing motor 50 for locating the selected tool 15 is accomplished by use of suitable micro switches and switch actuators correspondingly located in accordance with each tool position and which serves to control the activation, inactivation, positioning and rotation of the motor in accordance with the selected program, and turntable 17 is locked in accordance with the selected indexed position by positioning of rollers 56 and 57 in the slots of the indexing plate 52. Many suitable memory controlled program systems are commercially available for programming of machine tools and the present invention is readily adapted for incorporation therewith, the particular electrical connection of the particular circuits being dependent on the individual system chosen.

For effecting transfer of the tool 15 from its stored position on the turntable 17, after it has been selectively indexed, to the spindle 14 of the machine tool and back again, there is provided a tool change mechanism 30 illustrated in FIGS. 2–3. The tool change mechanism is operated by motive means 60 which is, for example, a hydraulic or air cylinder operatively connected to a rack and pinion drive generally illustrated at 21. Cylinder 60 is mounted on mounting plate 22 and has its arm 23 affixed to rack 24 of the rack and pinion drive 21. Operation of cylinder 60 serves to actuate the rack and pinion drive 21 to operate tongs 39 which are swung arcuately in a vertical plane and which open and close in various planes perpendicular to the vertical plane through the action of double acting air cylinder 61.

Tongs 39 are carried on a horizontally disposed rotatable shaft 62 which is carried between bearing or bracket plates 63 depending from mounting plate 22. Rotatable shaft 62 rotates between the bearing plates 63 through the action of gear 64 located on shaft 62 and which is operatively driven by gear segment 65 and crank arm 67 connected by means of pin 66 to gear segment 65 and pin 69 to pinion 25.

Referring to FIGS. 2–3, tongs 39 are illustrated in their closed position for engaging the tool adapters 20 and positioned below the spindle 14 of the operating station 10. Upon energization of hydraulic cylinder 60, arm 23, which is operatively connected to the rack 24 of the rack and pinion drive 21, is retracted. Retraction of arm 23 to the right moves rack 24 horizontally causing pinion 25 to rotate clockwise. Rotation of pinion 25 clockwise effects movement of crank arm 67 in a direction to first cause gear segment 65 to pivot clockwise, in FIGURE 3, about shaft 68. The gear segment 65 is ratioed so that upon a relatively small movement of crank arm 67 to bottom dead center, tongs 39 and shaft 62 are rotated counterclockwise approximately 180°.

As the connection 69 of crank arm 67 on pinion 25 approaches its lowermost or bottom dead center position, the movement of crank arm 67 is considerably lessened causing tongs 39 to be positioned intermediate a pair of legs 18 of the storage means 16. Further clockwise rotation of pinion 25 causes the cam surface 26 affixed to the pinion to engage a roller 27 carried by push rod 28. Push rod 28 is arranged to engage a lever arm 59 so that actuation of the lever arm causes relative motion between the legs 18 and tongs 39 so as to position the appropriate receptacle 19 directly under tongs 39. This is effected by having lever arm 59 secured to the turntable mounting plate 47 to arcuately move this plate 47 and turntable 17 about 20°. Upon continued clockwise rotation of the pinion 25 moving pin 69 past bottom dead center, roller 27 is engaged by the extended cam surface 29 which is long enough so as to maintain the turntable in position while the tongs are lowered due to the continuing clockwise movement of pinion 25. As pinion 25 moves pin 69 clockwise past bottom dead center, this pulls upward on the crank arm 69, reversing gear segment to now move counterclockwise. This causes the lowering of the tongs to deposit the tool in the receptacle 19, which is now positioned directly beneath the tongs through the action of cam surface 26 and push rod 28. The tongs 39 are now opened wide to release the grip on the tool adapter 20 and permit turntable 17 to index for the next selected tool.

Opening and closing of the tongs is effected through air cylinder 61. As more clearly shown in FIG. 4, tongs 39 which are manipulated to grasp the tool adapters 20 in the circumferential groove 31, include a pair of arms 41, 42 pivoted on a pin 43. The inner end of arm 41 is also pivoted on a pin 44 secured to shaft 62, while the inner end of arm 42 is affixed to the piston 45 of the air cylinder 61. Air is supplied to cylinder 61 from a suitable source (not shown), under control of a preselected program, and released through one side of cylinder 61 in a manner well known in the art. Forcing piston 45 in a direction against pin 44 causes arms 41 and 42 to close and grasp a selected tool adapter 20. When piston 45 is moved to the uppermost position in cylinder 61, arms 41 and 42 are drawn apart to their outermost extremities to provide clearance for the machining operation. As in the case of indexing of the turntable 17, the direction of rotation, activation and inactivation of the hydraulic cylinder 60 and air cylinder 61 is controlled by circuits activated in response to the system program.

To effect placement of the selected tool 15 in the spindle 14, the rotatable shaft 62 is located in an intermediate position between the tool storage station indexed for tool pick-up and the spindle 14 of the machine tool, so that when the tool 15 and its corresponding adapter 20 are positioned in the spindle 14 and are grasped by the tongs 39, the axis of the tool 15 will coincide with the axis of the matrix receptacle 19. Referring to FIG. 2, the turntable 17 and the receptacles 19 are shown in the tool transfer position. This position precedes or succeeds a transfer of the tool 15 and tool adapter 20 from or to the machine tool. The tool capturing or tool transfer station of the turntable 17 is an intermediate temporary dwell position between the positions shown in FIG. 2 and indicated as Stations A and B. With nine stations, the tool transfer station is displaced angularly 20° from the machine operation position of the turntable 17. However, a displacement of the turntable 17 more or less than 20 degrees in either direction may be made, provided only that the displacement is sufficient to provide clearance when the tongs 39 swing the tool 15 and adapter 20 back and forth from the spindle 14 to the tool capturing or tool change station for deposit in the receptacle 19.

For locking the tool adapter 20 and tool in the machine tool in preparation for a machining operation, spindle 14, referring to FIGS. 5 and 6, is provided with a chuck receptacle 80 machined to provide a taper 81 which is complementary to the taper surface 46 of tool adapter 20.

Referring to FIG. 5, there is shown a vertical cross-sectional view through the axis of the machine tool spindle comprising the spindle 14 mounted within a spindle sleeve. Within spindle 14 is mounted the chuck receptacle 80 adapted for receiving the tool adapter 20. At the lower extremity of chuck receptacle 80 is provided a plurality shown as a pair of latches 82, 83 having extending flange portions 84, 85, respectively, which engage the groove 34 of tool adapter 20 when the adapter 20 is inserted into the chuck receptacle 80. The latches 82 and 83 are pinioned on centers at 86 and 87, respectively, which permit them to be suspended pendulum-like and enter the groove 34. A tubular collar 88 having a flange 89 surrounds the chuck receptacle or driven spindle-adapter part 80 and is mounted for movement thereon along the axis of the adapter part 80. The inner lower end of the collar 88 is chamfered as at 90 at a small angle to provide a self-holding taper when engaging the outer locking surfaces 91, 92 of the free ends of latches 82, 83, respectively, and force the matching portions of opposite latches into the groove or recess 34 of the tool adapter 20, so as to cause the free ends of latches 82 and 83 to bear against oblique plane surfaces, thus locking the tool adapter 20 and tool 15 against turning in the spindle adapter 80. The locking collar is held in the downward or locked position by spring 93.

For unlocking the collar 88 to permit removal of the tool adapter 20 from the spindle 14, there are provided several air cylinders 94, only one of which is shown, which act against a ring 79. Ring 79 acts against the flange 89 of collar 88 to overcome the downward holding force of spring 93. When collar 88 is pushed upwardly, surface 105 bears against the extending heels 106, 107 of latches 82 and 83, respectively, so as to force the free ends of the latches out of the groove 34. Simultaneously, the lower faces 108, 109 of latches 82 and 83, respectively, bear against the surface 36 of the groove 34 to push the tool adapter 20 downwardly a small distance to assure that the tapers 46 and 81 are separated so as to facilitate removal of the tool adapter from the spindle.

In removal of a tool 15 and its adapter 20 from the spindle 14 and transporting it to its storage receptacle 19, the end gripping surfaces or members 37, 38 of tongs 39 are caused to move inwardly through the action of air cylinder 61 in a manner hereinbefore described and grip the tool adapter 20 at the groove 31. Immediately thereafter, in accordance with a preselected program control, through port 96 which is located beneath the head of cylinder 94, air is admitted under pressure. Cylinder 94, and other cylinders not shown, when actuated or energized cause their corresponding pistons to raise and overcome the force of spring 100. Continued motion of piston 98 causes engagement with flange 89 thus raising collar 88 until the chambered surface 90 clears the outer surfaces 91, 92 of latches 82, 83 causing them to be forced outwardly in a manner hereinbefore described. Thus, tool adapter 20 is freed for removal from the chuck receptacle 80 as shown in FIG. 6.

The tool adapter 20, being released from the chuck receptacle 80, is now ready for return to its storage position in receptacle 19. To accomplish this, the hydraulic cylinder 60 is energized to actuate the rack and pinion mechanism 21 as hereinbefore described.

It should be readily apparent that the above described tool change mechanism is readily adapted for use with a variety of machine tools for rapid positioning of a stored tool from its storage location to an operating position in the machine tool spindle, the overall sequence of steps for transfer of the tool taking approximately five seconds. The following example is illustrative of the operation of the tool change mechanism and illustrates the sequence involved in the tool transfer.

Assuming a tool 15 to be in the spindle and performing a machining operation, a demand for a change is made by a prearranged program, or by suitable switching arrangement at the machine operator's station. Immediately prior to the demand and during the machining operations, the tongs 39 are wide open and at rest as indicated by the dotted lines in FIG. 4. The empty tool receptacle 19 of the turntable 17 will be at a tool ready station in the position marked Station A. In this position of the matrix, the tools 15 and their adapters 20 can be swung arcuately in a vertical or reference plane between Stations A and B of the matrix and to a position above them for ready transfer by the tool transferring mechanism. After the tool removed from the spindle 14 is swung to the position above the Stations A and B, then cam surface 26 moves the receptacle 19 at Station A into the reference plane beneath the tool to receive it upon subsequent lowering of the tongs 39.

From the foregoing description, it is apparent that there has been provided a tool change mechanism for rapidly and automatically changing tools in a machine tool which is economical in construction and simple in operation and yet provides desired reliability in that it reduces the problems of jamming on separation of the tool from its holder. To this end, there is provided tool storage means wherein the tools are mounted in tool adapters and stored in a matrix on a turntable. The turntable is selectively indexed in order to bring the tools and adapters into position to be selectively captured by tool selection means and moved out of the tool storage means. The tool and adapter are swung through an arcuate path to be positioned within a tool spindle adapter and fastened therein for a machining operation. By reversing the process, the tool and adapter may be rapidly returned to its storage position.

Although particular embodiments of the subject invention have been described, many modifications may be made, and it is intended by the appended claims to cover all such modifications which fall within the true spirit and scope of the invention.

What is claimed is:

1. A tool change mechanism for changing a tool at the operating station of a machine comprising: a tool transfer station disposed for receiving tools that are to be transferred to the operating station of a machine, tool transfer means at said transfer station carried by the machine, said tool transfer means including tongs having a pair of arms pinioned at an intermediate position on said arms and disposed for movement in a pair of perpendicular planes, air means connected to said tongs for opening and closing said tongs in one of said planes, motive means including a rack and pinion connected to said tongs for rotating said tongs in the other of said planes whereby said tongs are carried to grasp said tool when said tongs are closed and transfer said tool in an arcuate path upon energization of said motive means to transfer said tool from said tool transfer station to the operating station, a cam surface connected to rotate with said pinion, means arranged for engagement with said cam surface to displace said total transfer station a distance less than approximately 25°, and means at said operating station arranged to receive said tool and operatively retain it therein.

2. The tool change mechanism as set forth in claim 1, wherein said means arranged for engagement with said cam surface comprises: a push rod and a lever supported by the tool change mechanism, the action of said push rod on said lever causing said tool transfer station to be rotated less than approximately 25°.

3. A tool change mechanism to move a tool between tool storage means and an operative position,
said tool storage means having a plurality of tool receptacles movable in a path including tool storage positions and a tool change station,
said tool receptacles having a given spacing therebetween,
said tool change mechanism comprising, in combination,
a base,
means carried on said base to grip a tool,
motive means to move said gripping means at least partly in a reference plane relative to said base to move the tool between the operative position and a tool change position of the tool storage means,
means to close and open said gripping means in a plane generally perpendicular to said reference plane to grip and to release a tool,
first means to index the tool storage means a distance corresponding to the spacing between adjacent tool receptacles,
second means to relatively index the tool storage means and said gripping means a distance approximately half the spacing between adjacent tool receptacles,
the tool storage means having a tool ready station of tool receptacles along the path of movement and being at a position spaced from said reference plane approximately half the distance between adjacent tool receptacles,
means to actuate the gripping means closed on a tool in the operative position and to actuate said motive means to move the tool in said reference plane between first and second tool receptacles in the tool storage means with said first tool receptacle being in said tool ready station,
and means to actuate said second indexing means to relatively move said gripping means and said first tool receptacle from said tool ready station to the tool change station.

4. A mechanism as set forth in claim 3 including means to reverse the direction of movement of said gripping means to deposit the tool therein in the tool receptacle in the tool change station.

5. A mechanism as set forth in claim 4 wherein said means to reverse the movement of said gripping means includes a crank arm pivotally connected to a rotatable member,
and means to move said rotatable member past dead center to reverse the movement of the crank arm.

6. A mechanism as set forth in claim 3 wherein said gripping means includes a pair of tongs which may be opened and closed in a scissors action to grip and release a tool.

7. A mechanism as set forth in claim 3 wherein said second indexing means includes cam and follower means actuated in response to movement of said motive means.

8. A mechanism as set forth in claim 3 wherein said second indexing means indexes the tool storage means and also indexes said first indexing means approximately half the spacing between adjacent tool receptacles.

9. A mechanism as set forth in claim 3 wherein said first indexing means includes a Geneva mechanism to index the tool storage means relative to a mounting plate,
and wherein said second indexing means indexes the entire mounting plate including the first indexing means and the tool storage means.

10. A mechanism as set forth in claim 3 wherein said motive means includes rack and pinion means,
a crank arm connected to rotate with said pinion,
and means to move said rack to move the crank arm from near top dead center past bottom dead center to reverse the direction of movement of the crank arm and reverse the direction of movement of the tool in the reference plane to deposit the tool in the tool receptacle in the tool change station.

11. A tool change mechanism to move a tool from tool storage means to an operative position and return,
said tool storage means having a plurality of tool receptacles movable in a path including tool storage position and a tool change station,
said tool receptacles having a given spacing therebetween,
said tool change mechanism comprising, in combination,
a base,
means carried on said base to grip a tool including a pair of tongs,
motive means to move said tongs in a reference plane relative to said base to move the tool between the operative position and the tool change station of the tool storage means,
means to close and open said tongs in a plane perpendicular to said reference plane to grip and to release a tool,
means to fully index the tool storage means a distance corresponding to the spacing between adjacent tool receptacles,
second means to partially index the tool storage means a distance approximately half the spacing between adjacent tool receptacles,
a tool ready station along the path of the tool receptacles being at a position spaced from said reference plane approximately half the distance between adjacent tool receptacles,
means to actuate the tongs closed on a tool in the operative position and to actuate said motive means to move the tongs and tool in said reference plane between first and second tool receptacles in the tool storage means with said first tool receptacle being in said tool ready station, means to actuate said second indexing means to move said first tool receptacle from said tool ready station to the tool change station, and means to reverse the movement of said tongs in said reference plane to deposit a tool in the tool receptacle in the tool change station.

12. In a tool change mechanism for a machine tool having an operating spindle and having a tool storage means movable in a path to provide a tool receptacle of the tool storage means at a tool change station, said tool change mechanism comprising, in combination, a horizontal shaft journalled in a frame for rotation, tongs having gripping surfaces and carried on said shaft to be rotated in an arc in a vertical reference plane, a first fluid cylinder to actuate said tongs between open and closed positions, a groove on a tool adapter carrying a tool to receive said gripping surfaces of said tongs to grip the tool adapter upon closing of the tongs by said first cylinder, a gear fixed on said horizontal shaft, a gear segment meshing with said gear, a crank arm pivotally connected to said gear segment, rack and pinion means, means to journal said pinion on said frame, means to pivotally connect said crank arm to said pinion, a second fluid cylinder connected to reciprocate said rack to move said pinion from top dead center with the tongs at the operating spindle to a bottom dead center position whereat said gear segment has rotated said gear and said tongs approximately 180 degrees to move the tool and adapter to a position intermediate first and second tool receptacles in the tool storage means, a cam connected to rotate with said pinion, a cam follower connected to partially move said tool storage means along said path to position the first of said receptacles in said reference plane vertically beneath said tongs, continued rotation of said pinion in the same direction past bottom dead center moving said gear segment in the opposite direction to lower said tongs and deposit the tool adapter therein into said first receptacle in said tool storage means, means to actuate said first cylinder to open said tongs to release the tool adapter positioned in said first receptacle, and means separate from said cam and follower to index said tool storage means by an amount equal to the spacing between said first and second tool receptacles to permit selection of another tool.

References Cited by the Examiner

UNITED STATES PATENTS

| Re. 25,812 | 6/1965 | Morgan | 29—568 X |
|---|---|---|---|
| 2,462,284 | 2/1949 | Rauch | 279—4 |
| 2,955,832 | 10/1960 | Gary | 279—103 |
| 3,042,419 | 7/1962 | Swanson | 279—103 |
| 3,052,011 | 9/1962 | Braniard | 29—568 |
| 3,129,506 | 4/1964 | Hain | 29—568 |
| 3,161,951 | 12/1964 | Anthony | 29—568 |
| 3,168,322 | 2/1965 | Dziedzic | 279—4 |
| 3,185,492 | 5/1965 | Dziedzic | 29—568 X |
| 3,186,085 | 6/1965 | Coate | 29—568 |
| 3,186,266 | 6/1965 | Coate | 29—568 X |
| 3,200,492 | 8/1965 | Lehmkuhl | 29—568 |

RICHARD H. EANES, JR., *Primary Examiner.*